June 13, 1961 R. FERGUSON 2,987,724
JOINT NAILING MECHANISM
Filed Aug. 25, 1958 3 Sheets-Sheet 1
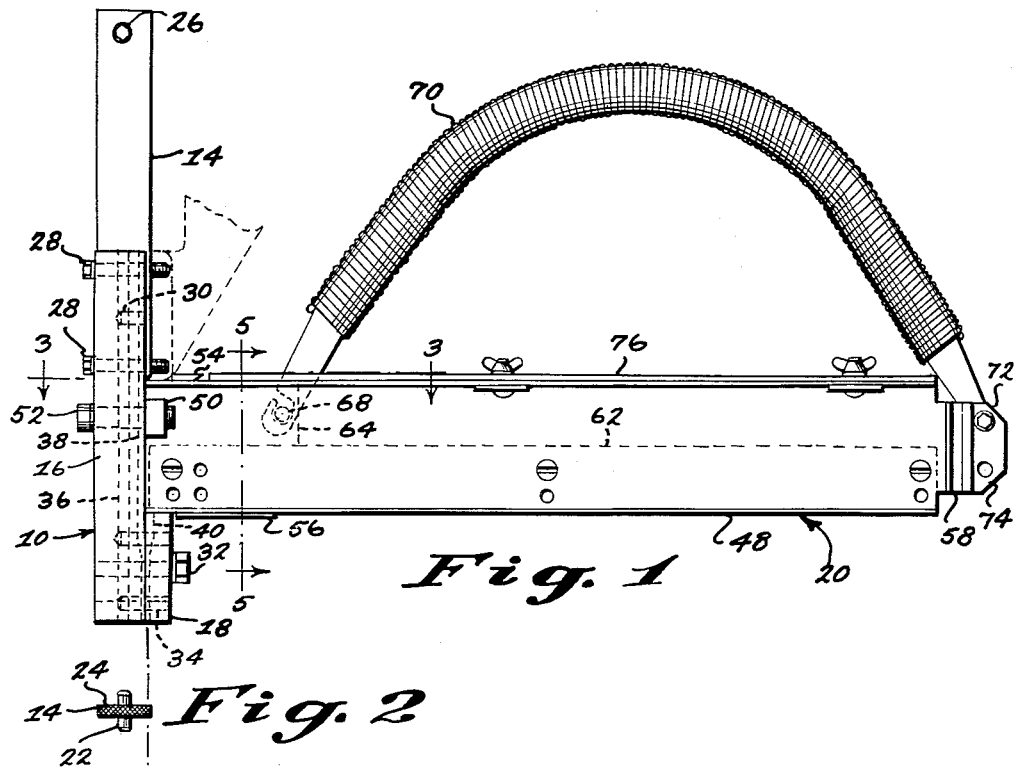
Fig. 1
Fig. 2
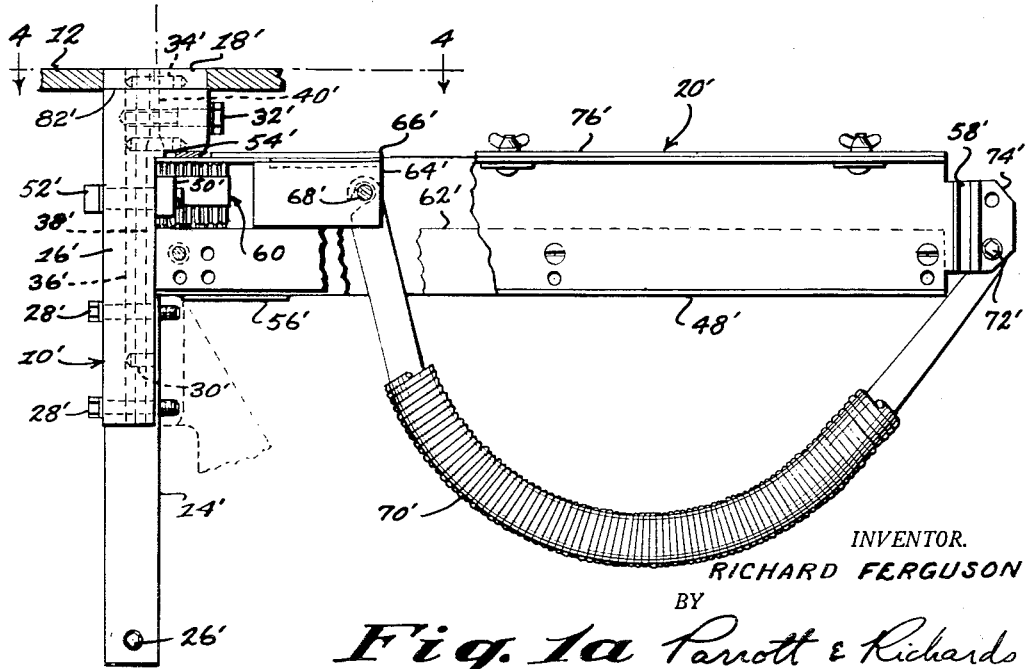
Fig. 1a
INVENTOR.
RICHARD FERGUSON
BY
Parrott & Richards
ATTORNEYS

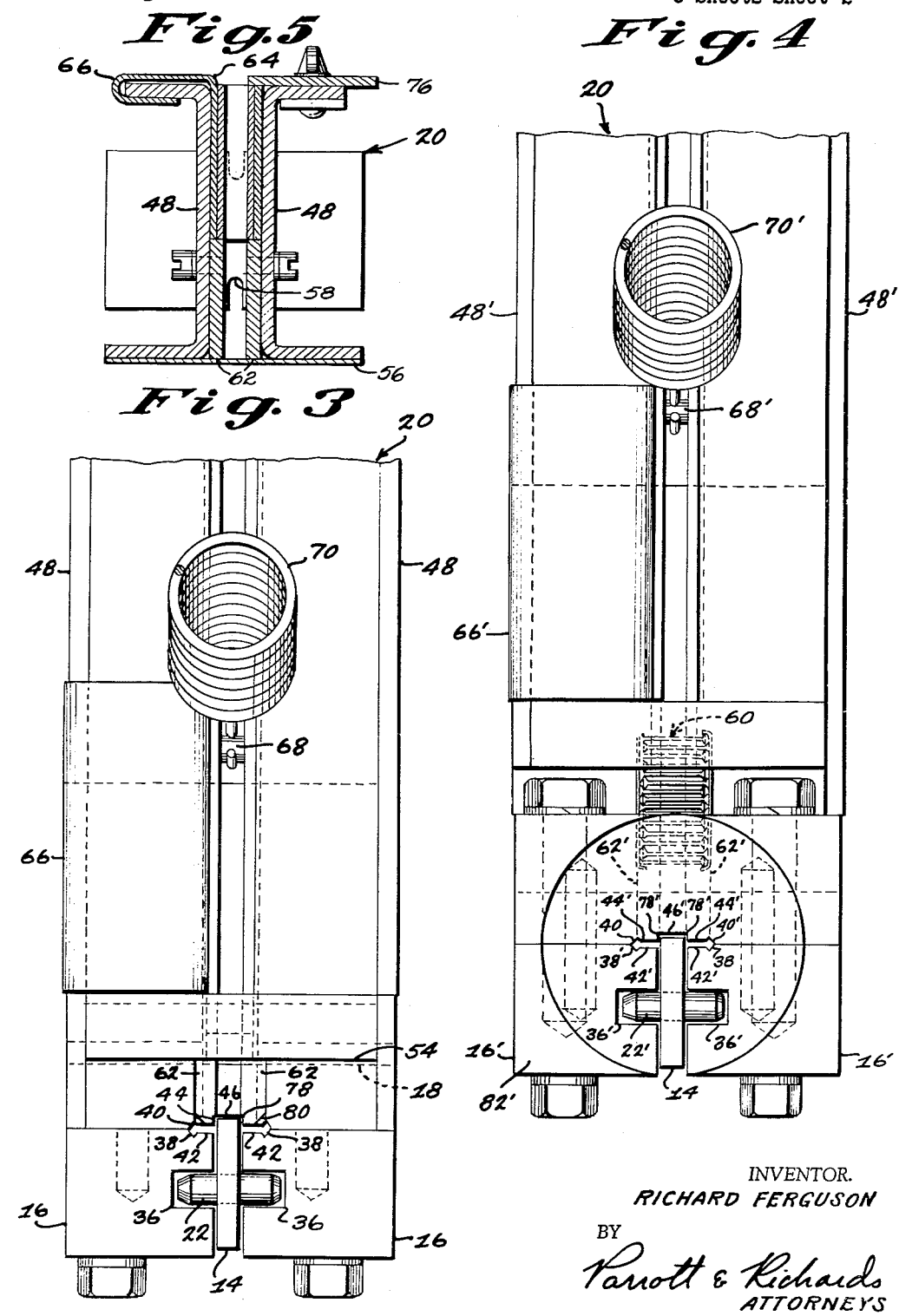

June 13, 1961  R. FERGUSON  2,987,724
JOINT NAILING MECHANISM
Filed Aug. 25, 1958  3 Sheets-Sheet 3
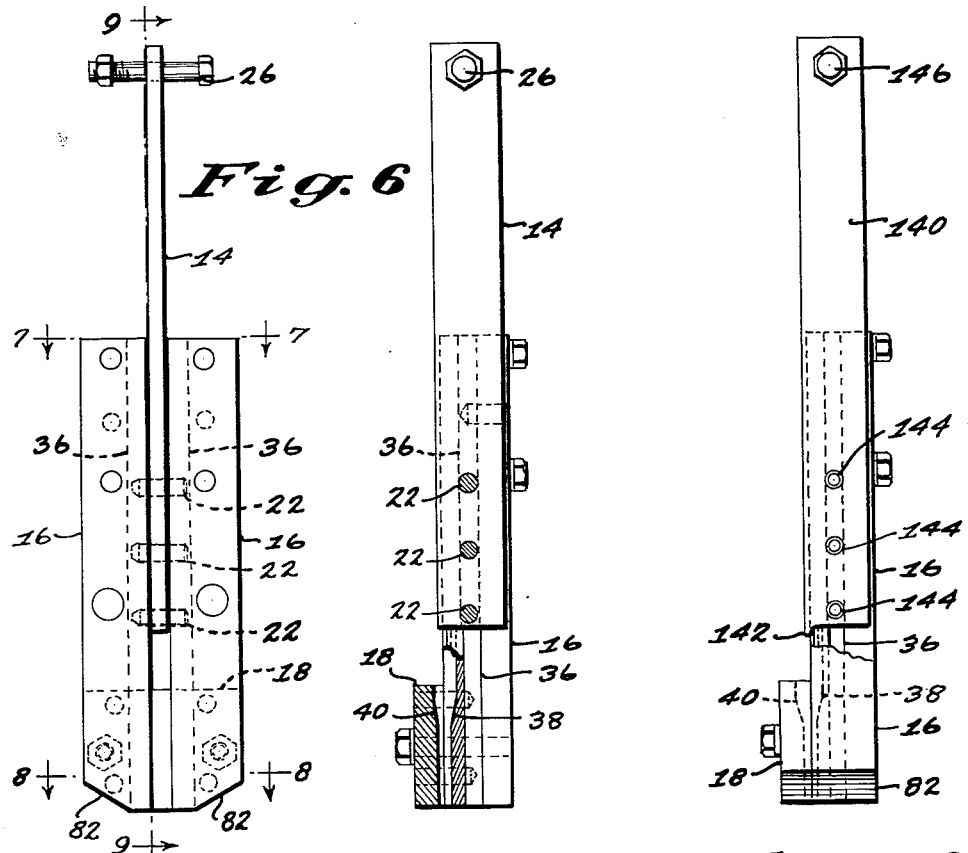
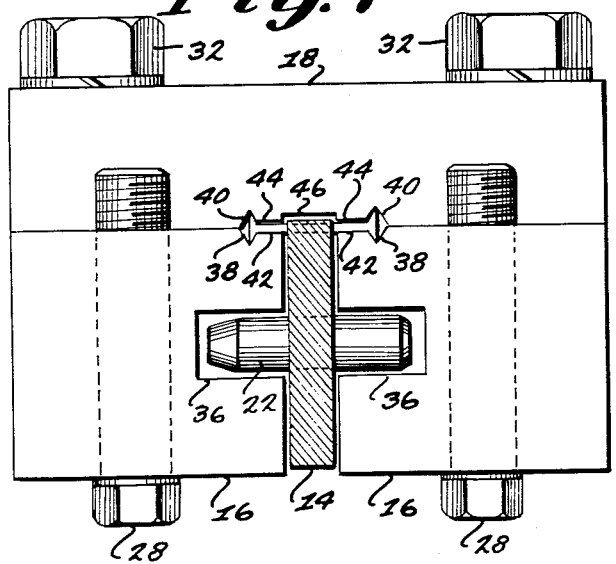
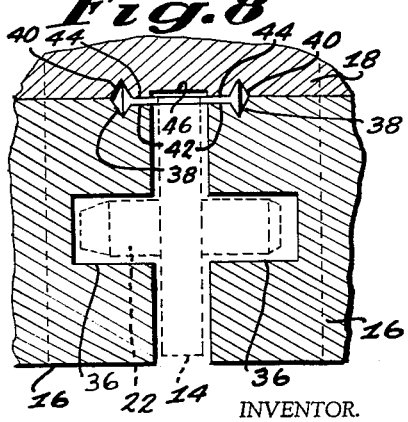
INVENTOR.
RICHARD FERGUSON
BY
Parrott & Richards
ATTORNEYS

United States Patent Office 2,987,724
Patented June 13, 1961

2,987,724
JOINT NAILING MECHANISM
Richard Ferguson, Charlotte, N.C., assignor to The Terrell Machine Company, a corporation of North Carolina
Filed Aug. 25, 1958, Ser. No. 756,803
14 Claims. (Cl. 1—46)

This invention relates to means for inserting or driving joint nails of the type having a web portion formed with opposite side edge clamping flanges, and more particularly to a novel mechanism by which joint nails of this sort may be handled and driven to excellent advantage in performing joint nailing operations.

A representative form and the function of the type of joint nail referred to above are illustrated and described in U.S. Patent No. 1,793,185. As usually employed, the joint nail web portion is formed flat for insertion in a transverse kerf at a corner joint or the like in furniture goods or other comparably jointed structures, while the side edge clamping flanges are formed in converging relation from the driven leading end of the nail toward the driving end thereof so that the flanges act to pull the joint tight as the nail is driven and to clamp it securely when set in place.

Joint nails of this sort are used to a very substantial extent in the furniture industry and related fields, but the handling and driving of these nails has heretofore been done largely by hand because their shape makes them difficult to handle otherwise and no suitable mechanism has previously been provided in practical form for this purpose.

The joint nailing mechanism of the present invention operates to feed the joint nails successively from a magazine to a driving guide in which a plunger is arranged for reciprocation to effect the driving. The joint nails are fed to the guide sidewise so that the web portions thereof are employed for positioning at the guide in a fixed plane to obtain consistent and effective driving of a single joint nail from a series being fed, while providing for lateral positioning and guiding of the joint nail flanges with respect to the plunger during driving.

As considerable dimensional variation beyond usual manufacturing tolerances is commonly encountered at the joint nail flanges, and as it will usually be desirable to feed the joint nails from a series assembled with the flanges staggered in alternately internested relation, the initial positioning of the joint nails at the guide in relation to the web portions thereof, and without particular reference to the initially fed position of the flanges, makes it possible to feed the joint nails readily and quite rapidly, while still allowing effective guiding of the joint nails by the guide as they are driven.

These and other features of the present invention are described in detail below in connection with the accompanying drawings, in which:

FIG. 1 is a side elevation of a joint nailing mechanism arranged in accordance with the present invention;

FIG. 1a is a related side elevation over a joint nailing mechanism arranged for opposed bottom operation in relation to top operation of the joint nailing mechanism shown in FIG. 1;

FIG. 2 is an end view of the driving plunger as shown in either FIGS. 1 or 1a to illustrate the form of the driving face thereof;

FIG. 3 is a plan view taken substantially at the line 3—3 in FIG. 1;

FIG. 4 is a generally corresponding plan view taken substantially at the line 4—4 in FIG. 1a;

FIG. 5 is an enlarged sectional detail taken substantially at the line 5—5 in FIG. 1;

FIG. 6 is a front elevation corresponding generally to FIG. 1;

FIG. 7 is an enlarged sectional detail taken substantially at the line 7—7 in FIG. 6;

FIG. 8 is a further enlarged sectional detail taken substantially at the line 8—8 in FIG. 6;

FIG. 9 is a sectional detail taken substantially at the line 9—9 in FIG. 6; and

FIG. 10 is a side elevation of a modified form of driving plunger.

Referring now in detail to the drawings, FIGS. 1 and 1a indicate the arrangement of a related pair of top and bottom joint nailing mechanisms 10 and 10' embodying the present invention as they would be disposed for operation in joint nailing apparatus of the type disclosed in copending application Serial No. 418,137, filed March 23, 1954, now Patent No. 2,900,638, issued August 25, 1959; a work table being represented fragmentarily at 12 on which the work to be joint nailed would be supported and preferably positioned by suitable jigging or the like (not shown), to have joint nails inserted therein from above by the top joint nailing mechanism 10, and from below by the bottom mechanism 10'.

While such an arrangement will usually be the one best suited for carrying out most joint nailing operations, it should be noted that either or both of the top and bottom mechanisms 10 and 10' may be differently arranged for related or separate operation to equal advantage in instances where special requirements make some other arrangement desirable.

The top and bottom joint nailing mechanisms 10 and 10' are substantial counterparts with only such differences as are necessary for their respective downward and upward driving operation; each mechanism comprising a driving plunger 14 or 14', a pair of guide blocks 16 or 16' between which the driving plungers 14 and 14' are slidably disposed for reciprocation, a complementary guide block 18 or 18' forming with the guide block pairs 16 and 16' a driving guideway for the joint nails, and a magazine feeding means 20 or 20' mounted on the guide block pairs 16 and 16', respectively, above and below the complementary guide blocks 18 and 18'.

The driving plungers 14 and 14' are preferably rectangular in cross section, with spaced dowels 22 and 22' fixed transversely in longitudinal alignment adjacent the driving end thereof to form spline means for locating their sliding disposition between the guide block pairs 16 and 16'. Feather keys or other equivalent means might alternatively be used for locating the plungers 14 and 14', although the spaced dowels 22 and 22' serve this purpose to good advantage and provide the further advantage of being readily assembled with the plungers 14 and 14' by simply press fitting them in place.

The driving end face of each plunger 14 and 14' is preferably knurled, as indicated at 24 in FIG. 2, and hardened for gripping the driving edge of the joint nail web portions against lateral slipping during driving. In addition, the plungers 14 and 14' are fitted adjacent their driven ends with assembly bolts 26 and 26' or the like for connection with a suitable actuating means such as an air cylinder having a piston rod arranged with a clevis at the extending end thereof (not shown).

The pair of guide blocks 16 and 16', which are of relatively elongated form and generally square in cross section, carry the other elements of the respective joint nailing mechanisms 10 and 10', as well as slidably locating and guiding the plungers 14 and 14', and for this purpose are formed to receive mounting bolts at 28 and 28' and are bored at 30 and 30' for aligning dowels to provide for attachment to a suitable supporting frame structure (not shown). As indicated in FIGS. 1 and 1a, this frame structure attachment of the guide block pairs 16 and 16' is made adjacent the ends thereof opposite those at which the complementary guide blocks 18 and 18' are disposed to form therewith the guideways from which the joint nails are driven, and as the complementary guide blocks 18 and 18' are bolted at 32 and 32' on the guide block pairs 16 and 16' with aligning dowels as indicated at 34 and 34', the alignment of the guide block pairs 16 and 16' is thereby fixed for forming the driving plunger slideways.

The thus aligned disposition of the guide block pairs 16 and 16' is such as to space the blocks of each pair in parallel relation at a spacing slidably fitting the rectangular cross section of the plungers 14 and 14' widthwise; the opposed faces of each guide block pair 16 and 16' being grooved lengthwise at 36 and 36' for in turn slidably fitting the splining dowels 22 and 22' carried by the plungers 14 and 14'. As slidably disposed for reciprocation between the guide block pairs 16 and 16' in this manner, the driving plungers 14 and 14' are located so as to project to the side of the guide blocks 16 and 16' at which the complementary guide blocks 18 and 18' are carried in an extent at least equal to the web portion thickness of the joint nails to be driven but not exceeding this thickness by more than about 50%, and the cross section of the plungers 14 and 14' is proportioned so that the projecting width thereof is substantially less than the width of the joint nail web portions.

The side faces of the guide blocks 16 and 16' on the side at which the plungers 14 and 14' project are additionally formed with lengthwise clearance grooves 38 and 38' for receiving the flanges of the joints nails to be driven. These clearance grooves 38 and 38' are illustrated as being V-shaped in cross section and as tapering lengthwise, in the direction toward which the plungers 14 and 14' reciprocate for driving, from a relatively large clearance width for initially receiving the joint nail flanges freely to a narrower guiding width within the extent of the complementary guide blocks 18 and 18', which are formed with registering clearance grooves 40 and 40', for laterally guiding the joint nail flanges closely with respect to the plungers 14 and 14' during driving.

Actually, a wide variation is possible beyond that illustrated in the particular form and arrangement of the clearance grooves 38 and 38', and 40 and 40', so long as provision is made by the form and arrangement selected to effect adequate lateral guiding of the joint nail flanges. For this purpose the essential condition is that corresponding side edges, either inner or outer, of the clearance grooves be spaced to provide the lateral guiding effect. Otherwise, the grooves may have any form in cross section desired, they may be arranged lengthwise on an angled axis rather than being tapered, and the lateral guiding action can be provided solely by one set of the clearance grooves 38 and 38', or 40 and 40', while the other set maintains a clearance relation throughout the length thereof.

The joint nails are primarily positioned and guided for driving at the side face lands 42 and 42' presented by the guide block pairs 16 and 16' between the clearance grooves 38 and 38' therein and at registering side face portions 44 and 44' similarly arranged in the complementary guide blocks 18 and 18' at either side of relief grooves 46 and 46' provided therein for clearing the projecting portions of the plungers 14 and 14'. The side face lands 42 and 42' provide abutment surfaces against which the web portions of the joint nails being driven may be initially positioned in a fixed plane aligned with the plungers 14 and 14' for driving thereby while allowing lateral shifting of the joint nails in this plane for guiding or centering, as mentioned above, during driving.

The joint nails being driven are supplied for initial positioning at the guide block lands 42 and 42' by the previously noted magazine feeding means 20 and 20', each of which comprise a pair of channel shaped side frames 48 and 48' carrying mounting lugs at 50 and 50' to engage bolts 52 and 52' by which they are attached to the guide block pairs 16 and 16' with the flanges forming the channel shapes thereof extending outwardly. The side frame pairs 48 and 48' are held parallel in properly spaced relation for mounting in this manner by top, bottom and rear tie plates 54 and 54', 56 and 56', and 58 and 58', that are welded or otherwise fixed thereto; this spacing being such as to provide for containing a series of the joint nails to be driven (as indicated at 60 in FIG. 1a) standing uprightly and transversely on supporting rails 62 and 62' fixed at the inner faces of the side frames 48 and 48'.

Disposition of a supply of joint nails serially between the side frames 48 and 48' on the supporting rails 62 and 62' can be accomplished conveniently and efficiently by using joint nail packages of the type disclosed and claimed in copending application Serial No. 752,285, filed July 31, 1958, in which case the joint nails will preferably be arranged with the flanges thereof staggered in alternately internested relation, as indicated in FIGS. 1a and 4, and the spacing of the side frames 48 and 48' will be proportioned to accommodate this staggered flange relation. Also, it should be noted that the clearance grooves 38 and 38', at which the joint nails are initially positioned for driving, must be proportioned in correspondence with the spacing of the magazine side frames 48 and 48' so as to receive the joint nail flanges freely therefrom as the web portions of the joint nails are successively positioned at the guide block lands 42 and 42' in the path of the driving plunger 14 or 14'.

In order to provide for feeding the serially arranged joint nails 60 disposed therein, each magazine 20 and 20' is fitted with a follower slide 64 and 64' arranged to ride therein on the support rails 62 and 62' in backing relation with respect to the series of joint nails. These follower slides 64 are formed with stabilizing wing portions 66 and 66' shaped for slidable disposition about the top flange of one magazine side frame of each pair 48 and 48', and carry anchoring pins 68 and 68' rearwardly thereof at which coil springs 70 and 70' may be removably engaged with a bent disposition for exerting a feeding bias or pressure from a fixed anchoring pin 72 and 72' carried in angle brackets 74 and 74' mounted on the rear side frame tie plates 60 and 60'. The top flange of the magazine side frame of each pair 48 and 48' opposite the one over which the follower slide wing portions 66 and 66' are disposed is further fitted with an adjustable top guide plate 76 and 76' arranged so that it may be set inwardly of the side frame 48 and 48' on which it is carried sufficiently to overlie a joint nail series 60 disposed in the magazines 20 and 20' enough to prevent any upward displacement thereof from the feeding pressure exerted by the bias spring 70 and 70', while at the same time allowing adequate clearance for the biasing action of these springs 70 and 70' on the follower slides 64 and 64'.

As thus arranged, the magazines 20 and 20' act on a series of joint nails disposed therein to maintain a feeding pressure thereon towards the pairs of guide blocks 16 and 16' so as to position the joint nails successively thereat for driving. As previously mentioned, the positioning of the joint nails for driving is done at the web portions thereof, but it should be noted that while each joint nail is being driven the web portion of the following joint nail in the supply series must necessarily bear against the projecting face of the driving plunger 14 or 14' during its driving and recovery reciprocation, and that the resulting frictional contact with the reciprocating plunger would tend to displace the following joint nail prematurely from the supply series unless some means were provided to prevent such displacement.

For this purpose, the magazine supporting rails 62 and 62' are specially formed at their feeding ends with inner face plunger clearance notches 78 and 78', and the top magazine supporting rails 62 additionally have outer face bevels 80 formed thereon for clearing the flanges of a joint nail being driven. By this arrangement the supporting rails 62 and 62' are shaped so that their feeding ends may be disposed closely adjacent the pairs of guide blocks 16 and 16'. In the case of the bottom magazine supporting rails 62', they may be set in substantially abutting relation at the guide blocks 16' as the joint nails are driven upwardly therefrom and it is only necessary to clear the driving plunger 14' at the clearance notches 78, while leaving the rails 62' extending otherwise to support the joint nails fully until driven upwardly therefrom and thereby prevent any frictional joint nail displacement during recovery reciprocation of the plunger 14'. Similar joint nail displacement during driving reciprocation of the plunger 14' is prevented by the complementary guide block 18', the side face portions 44' of which will not allow a joint nail to pass until it has been positioned against the side face lands 42' of the guide blocks 16'. In the case of the top magazine supporting rails 62, the feeding ends thereof must be spaced from the guide blocks 16 sufficiently to allow a joint nail web portion to pass downwardly thereat during driving, but this spacing may be readily set close enough to prevent any possibility of displacing the following joint nail during driving reciprocation of the plunger 14. During recovery reciprocation of plunger 14 such displacement is prevented by the previously mentioned frame structure (not shown) to which the guide blocks 16 are attached by the mounting bolts 28, or the top tie plate 56 may be set forwardly for this purpose.

Upon completion of each recovery reciprocation of the plungers 14 and 14' the joint nail at the leading end of the supply series in the magazines 20 and 20' is accordingly fed into proper position at the guide blocks 16 and 16' with the joint nail web portions bearing against the side face lands 42 and 42' so as to be aligned in a fixed plane transversely of the plunger reciprocation path and thereby located endwise of the plungers 14 and 14' at the projecting portions thereof for driving.

At the same time, the joint nail flanges are received in the clearance grooves 38 and 38' which are arranged to receive the flanges freely from the magazine side frames 48 and 48', so that the initial disposition of the flanges may be off center with respect to the plungers 14 and 14'. As the driving stroke of the plungers 14 and 14' commences to displace an aligned joint nail in the driving direction, however, the flanges pass lengthwise through the clearance grooves 38 and 38', and the registering extent of the complementary guide block grooves 40 and 40', to be guided gradually and smoothly to the lateral centering extent necessary, and the centered joint nails then finally emerge under the driving force of the plungers 14 and 14' while being closely held and guided between the pairs of guide blocks 16 and 16' and the complementary guide blocks 18 and 18' mounted respectively thereon.

In order to provide for close positioning with respect to the work in which the joint nails are being driven, the driving end faces of the guide block 16 and 18 may have the side corners thereof angularly relieved as indicated at 82 in FIGS. 1 and 6. Also, for a bottom joint nailing mechanism 10', the driving end of the guide block 16' and 18' are preferably shouldered, as indicated at 82' in FIGS. 1a and 4 so as to allow insetting thereof at the work table 12.

A further feature that may be employed to good advantage according to the present invention in a number of instances is a modified form of driving plunger, such as is illustrated at 140 in FIG. 10, in which the driving end face is relieved to form a driving tip 142 thereon in relation to the projecting extent of the plunger to one side of guide block pair between which it operates. Such a driving tip 142 makes it possible to set the joint nails being driven below the surface of the work in which they are being inserted as is sometimes required and is often quite desirable. Otherwise, this modified plunger 142 may be fitted with spaced splining dowels 144 and with an assembly bolt 146 for connection to a driving source, all in exactly the same manner and for operation in exactly the same way as the previously described driving plungers.

As appears from the foregoing description of the joint nailing mechanism provided according to the present invention, an operating cycle of this mechanism proceeds as follows. Assuming that the plunger 14 or 14' has completed full recovery reciprocation in preparation for a succeeding driving stroke, and that a serially arranged supply of joint nails 60 is disposed in the magazine 20 or 20' with the magazine follower slide 64 or 64' biased in backing relation thereto by the spring means 70 or 70', the leading joint nail of the supply series 60 is fed from the magazine 20 or 20' to a position at which the web portion thereof bears against the side face lands 42 or 42' of the pair of guide blocks 16 or 16' and is thereby aligned in a fixed plane transversely of the path in which the plunger 14 or 14' will reciprocate during its driving stroke. At the same time, the forward edges of the leading joint nail flanges are received in the clearance grooves 38 and 38' arranged at each side of the guide block lands 42 or 42' to receive these forward edges freely at this stage. Driving reciprocation of the plunger 14 or 14' thereupon acts to displace the thus aligned leading joint nail in the driving direction as the portion of the plunger 14 or 14' projecting beyond the guide blocks 16 or 16' engages endwise the driving edge of the joint nail web portion located at the guide block land portions 42 or 42'. The continued driving stroke reciprocation of the plunger 14 or 14' carries before it the aligned joint nail to pass between the pair of guide blocks 16 or 16' and the complementary guide block 18 or 18' at the registering extent thereof through which the web portion of the aligned jointed nail is maintained in its fixed plane transversely of the plunger 14 or 14' between the opposed side face lands 42 or 42' and 44 or 44' of the respective guide blocks, while the joint nail flanges pass lengthwise through the clearance grooves 38 or 38' and 40 or 40' which taper lengthwise in the driving direction, as previously noted, to center the aligned joint nail gradually and smoothly for final emergence from the guide blocks to be driven by the plunger 14 or 14' into the work being secured. In completing the final driving of the aligned joint nail the driving end of the plunger 14 or 14' will likewise emerge to some extent from the guide blocks in order to insert the driven joint nail fully in the work being secured, and where the nature of the work requires any substantial spacing of the guide blocks from the work so as in turn to require a correspondingly substantial emergence of the plunger 14 or 14' therefrom for driving, it is advantageous to have the driving end face of the plunger 14 or 14' knurled, as indicated at 24 in FIG. 2, so that the plunger will continue to act on the driving edge of the joint nail web portion without lateral slipping during the final driving of the joint nail, when it is no longer held and guided by the pairs of guide blocks 16 or 16' and the complementary guide blocks 18 or 18'. During the driving stroke reciprocation of the plunger 14 or 14' for inserting an aligned joint nail, as just described above, the next succeeding joint nail in the supply series 60 contained in the magazine 20 or 20' will have its web portion forced against the adjacent projecting side face of the plunger 14 and 14', but is held against displacement during this plunger driving stroke, and during the subsequent recovery reciprocation, by the previously described arrangement of the magazine 20 or 20' for this purpose. As soon as the recovery reciprocation of the plunger 14 or 14' is completed, however, the succeeding joint nail of the supply series 60 is advanced to the previously described aligned position against the guide block lands 42 or 42' in readiness for a repeating operating cycle.

The present invention has been described in detail above for purposes of illustration only and is not intended to

I claim:

1. Apparatus for driving flanged joint nails of the type having a web portion formed with opposite side edge clamping flanges, said apparatus comprising guide elements forming a guideway for directing said joint nails successively in the driving direction and presenting a guide surface against which the web portions of said joint nails may be located in a fixed plane for driving and at the side edges of which the clamping flanges of said joint nails may be centered in said guideway during driving, and means for successively delivering joint nails to said guideway for driving with the web portions thereof initially located against said guide surface and the flanges thereof arranged in spaced relation to the side edges of said guide surface for subsequent centering thereby as said joint nails are directed by said guideway in the driving direction.

2. Apparatus for driving flanged joint nails of the type having a web portion formed with opposite side edge clamping flanges, said apparatus comprising assembled guide elements forming a guideway for directing said joint nails successively in the driving direction and a slideway for directing a driving plunger lengthwise along said guideway, certain of said guide elements further forming abutment surfaces against which the web portions of said joint nails may be initially located in a fixed plane for driving through said guideway by said plunger and having opposite recessed side edges against which the clamping flanges of said joint nails engage and are centered in said guideway during direction of said joint nails therethrough for driving.

3. Apparatus for driving flanged joint nails of the type having a web portion formed with opposite side edge clamping flanges, said apparatus comprising a driving plunger, means forming a slideway receiving said driving plunger for reciprocation, said means being further formed for positioning said joint nails successively with the web portions thereof initially disposed in fixed transverse relation across the reciprocation path of said plunger for endwise driving thereby, and said means additionally forming a guideway for directing the driving of said joint nails in said fixed transverse relation upon reciprocation of said plunger in said slideway, the guideway additionally formed by said means also incorporating clearance grooves at opposite sides thereof for initially receiving the clamping flanges of said joint nails freely and subsequently centering said flanges in said guideway during direction of said joint nails therethrough for driving.

4. Apparatus as defined in claim 3 and further characterized in that the driving end of said plunger is knurled and hardened for gripping the driving edge of said joint nail web portions against lateral slipping thereon during final driving beyond the guideway formed by said means.

5. Apparatus for driving flanged joint nails of the type having a web portion formed with opposite side edge clamping flanges, said apparatus comprising a driving plunger, a pair of relatively elongated guide blocks spaced for receiving said plunger slidably therebetween and having the opposed faces thereof formed for slidably locating said plunger at a disposition projecting to one side of said pair of guide blocks in an extent at least equal to the web portion thickness of said joint nails and not exceeding said thickness by more than about 50%, said pair of guide blocks being further formed at the side faces thereof on the side to which said plunger projects for receiving the flanges of said joint nails while permitting location of the web portions thereof against said side faces, and a complementary guide block assembled at said side faces of said pair of guide blocks adjacent the ends thereof toward which said plunger slides for driving.

6. Apparatus as defined in claim 5 and further characterized in that the driving end of said plunger is relieved to form a driving tip thereon in relation to the projecting extent of said plunger to one side of said pair of guide blocks.

7. Apparatus as defined in claim 5 and further characterized in that said pair of guide blocks and said complementary guide block at the ends thereof from which said joint nails are driven have the end face corners thereat relieved for close disposition within a corner joint at which said joint nails are to be driven.

8. Apparatus for driving flanged joint nails of the type having a web portion formed with opposite side edge clamping flanges, said apparatus comprising a pair of relatively elongated guide blocks forming a slideway therebetween, a driving plunger disposed for reciprocation in the slideway formed by said pair of guide blocks while projecting to one side of said guide blocks in an extent at least equal to the web portion thickness of said joint nails but not exceeding said thickness by more than about 50%, the side faces of said pair of guide blocks at the side thereof on which said plunger projects having clearance grooves formed lengthwise therein for receiving the flanges of said joint nails so as to permit location of the web portions thereof against said side faces, and a complementary guide block formed with registering clearance grooves and side face portions assembled at said side faces of said pair of guide blocks adjacent the ends thereof toward which said plunger slides for driving, the clearance grooves in at least one of said pair of guide blocks and said complementary guide block being formed for laterally positioning and guiding said joint nail flanges with respect to said plunger during driving.

9. Apparatus as defined in claim 8 and further characterized in that the clearance grooves in said pair of guide blocks are formed in a width sufficient to receive said joint nail flanges when presented thereto successively from a sidewise series of joint nails assembled with the flanges thereof staggered in alternately internested relation.

10. Apparatus for driving flanged joint nails of the type having a web portion formed with opposite side edge clamping flanges, said apparatus comprising a driving plunger, guided means forming a slideway locating said plunger for reciprocation with a driving portion thereof projecting sidewise from said guide means in an extent at least equal to the web portion thickness of said joint nails and not exceeding said thickness by more than about 50%, and feeding means for holding a joint nail with the web portion thereof bearing sidewise against the projecting face of said plunger during driving and recovery reciprocation thereof with respect to a preceding joint nail and for biasing said first mentioned joint nail at said sidewise bearing position to shift against said guide means into endwise relation to said plunger upon completion of said recovery reciprocation.

11. Apparatus for driving flanged joint nails of the type having a web portion formed with opposite side edge clamping flanges, said apparatus comprising guide means forming a slideway, a driving plunger disposed for reciprocation in the slideway formed by said guide means while projecting to one side of said guide means in an extent at least equal to the web portion thickness of said joint nails and not exceeding said thickness by more than about 50%, and a magazine mounted at the side of said guide means on which said plunger projects, said magazine being formed for containing a series of joint nails and incorporating means for feeding said series to said guide means with the web portions of the joint nails therein disposed sidewise against said guide means side and transversely of the reciprocation path of said plunger, and said magazine being arranged in relation to said guide means for holding said joint nails against displacement from said series until disposed against said guide means side.

12. Apparatus for driving flanged joint nails of the type having a web portion formed with opposite side edge clamping flanges, said apparatus comprising a pair of relatively elongated guide blocks forming a slideway therebetween, a driving plunger disposed for reciprocation in said slideway while projecting to one side of said pair of guide block in an extent at least equal to the web portion thickness of said joint nails and not exceeding said thickness by more than about 50%, the side faces of said pair of guide blocks at the side thereof on which said plunger projects being grooved lengthwise for receiving and guiding the flanges of said joint nails while permitting location of the joint nail web portions against said guide block side faces, a complementary guide block formed with registering grooves and side face portions assembled on said guide block side faces at the ends thereof toward which said plunger reciprocates for driving, and a magazine mounted at said guide block side faces adjacent said complementary guide block for feeding said joint nails successively to dispose the web portions thereof sidewise against said guide block side faces and the flanges thereof in said side face grooves, said magazine being arranged in relation to said guide blocks for preventing displacement of said joint nails by said plunger until disposed against said guide block side faces.

13. Apparatus for driving flanged joint nails of the type having a web portion formed with opposite side edge clamping flanges, said apparatus comprising guide elements forming a guideway for directing said joint nails successively in the driving direction and presenting a guide surface against which the web portions of said joint nails are initially located in a fixed plane for driving, the guideway formed by said guide elements additionally incorporating clearance grooves sidewise of said guide surface in which the clamping flanges of said joint nails are freely received initially and subsequently centered in said fixed plane during direction of said joint nails by said guideway for driving, and a magazine disposed in relation to said guide elements for feeding said joint nails successively to dispose the web portions thereof initially against said guide surface and the clamping flanges thereof in said clearance grooves, said magazine being formed for containing a series of said joint nails arranged sidewise in substantially parallel relation with respect to each other and in relation to said guide surface, and said magazine further incorporating means for supporting said joint nails against displacement from said series until initially disposed against said guide surface.

14. Apparatus for driving flanged joint nails of the type having a web portion formed with opposite side edge clamping flanges, said apparatus comprising a pair of relatively elongated guide blocks spaced in parallel relation and having the opposed faces thereof grooved lengthwise for forming a slideway therebetween, a driving plunger having a rectangular cross section slidably disposed widthwise between said pair of guide blocks for reciprocation and having lateral spline means thereon fitting said guide block grooves, said plunger being located by said spline means so as to project to one side of said guide blocks in an extent at least equal to the web portion thickness of said joint nails and not exceeding said thickness by more than about 50%, and the projecting width of said plunger being substantially less than the width of the web portions of said joint nails, said pair of guide blocks having the side faces thereof at the side on which said plunger projects formed with lengthwise clearance grooves for receiving the flanges of said joint nails so as to permit location of the web portions thereof against said guide block side faces, a complementary guide block formed with registering clearance grooves and side face portions assembled at said side faces of said pair of guide blocks adjacent the ends thereof toward which said plunger reciprocates for driving, and feeding means for supporting said joint nails successively with the web portions thereof bearing sidewise against the projecting face of said plunger during driving and recovery reciprocation thereof with respect to a preceding joint nail and for biasing said joint nails successively at said sidewise bearing position to shift against said guide block side faces into endwise relation to said plunger upon completion of said recovery reciprocation, the clearance grooves in at least one of said pair of guide blocks and said complementary guide block being formed for laterally positioning and guiding said joint nail flanges with respect to said plunger during driving.

References Cited in the file of this patent
UNITED STATES PATENTS

| 1,721,561 | Jensen | July 23, 1929 |
| 2,087,668 | Heller | July 20, 1937 |
| 2,154,747 | Heyser | Apr. 18, 1939 |
| 2,401,840 | Olson | June 11, 1946 |
| 2,423,821 | Anstett | July 15, 1947 |
| 2,618,778 | Granfield | Nov. 25, 1952 |
| 2,900,638 | O'Kelley | Aug. 25, 1959 |